United States Patent
Fujimoto

[11] Patent Number: 6,166,832
[45] Date of Patent: Dec. 26, 2000

[54] CONTACT-TYPE IMAGE SENSOR

[75] Inventor: Hisayoshi Fujimoto, Kyoto, Japan

[73] Assignee: Rohm Co., Ltd., Kyoto, Japan

[21] Appl. No.: 09/091,852

[22] PCT Filed: Dec. 26, 1996

[86] PCT No.: PCT/JP96/03872

§ 371 Date: Jun. 25, 1998

§ 102(e) Date: Jun. 25, 1998

[87] PCT Pub. No.: WO97/23991

PCT Pub. Date: Jul. 3, 1997

[30] Foreign Application Priority Data

Dec. 26, 1995 [JP] Japan ................................. 7-339694
Dec. 13, 1996 [JP] Japan ................................. 8-333276

[51] Int. Cl.[7] ................................................. H04N 1/04
[52] U.S. Cl. .......................... 358/484; 358/483; 358/474
[58] Field of Search .................................. 358/484, 482,
358/483, 474, 496, 513, 514, 498, 494,
497, 471, 408; 250/208.1; 382/312, 313

[56] References Cited

U.S. PATENT DOCUMENTS

| | | | |
|---|---|---|---|
| 5,182,445 | 1/1993 | Yamashita | 250/208.1 |
| 5,198,655 | 3/1993 | Suetsugu et al. | |
| 5,434,682 | 7/1995 | Imamura et al. | 358/474 |
| 5,579,114 | 11/1996 | Imamura. | |
| 5,780,840 | 7/1998 | Lee et al. | 250/208.1 |
| 5,859,421 | 1/1999 | Onishi et al. | 250/208.1 |
| 5,949,062 | 9/1999 | Matsumoto. | |

FOREIGN PATENT DOCUMENTS

| | | | |
|---|---|---|---|
| 61-84622 | 4/1986 | Japan | G02B 27/18 |
| 61-88659 | 5/1986 | Japan | H04N 1/04 |
| 1-176953 | 12/1989 | Japan | H01L 27/14 |
| 4-70053 | 3/1992 | Japan | H04N 1/028 |
| 4-101557 | 4/1992 | Japan | H04N 1/028 |
| 4-286458 | 10/1992 | Japan | H04N 1/028 |
| 7-46374 | 2/1995 | Japan | H04N 1/028 |

*Primary Examiner*—Cheukfan Lee
*Attorney, Agent, or Firm*—Michael D. Bednarek; Shaw Pittman

[57] ABSTRACT

A contact-type image sensor (20) comprises a case (21), a glass cover (22) provided on an upper surface of the case (21), a bottom substrate (23) mounted in a bottom surface of the case (21), light receiving elements (24) mounted on the bottom substrate, light emitting elements (25) for irradiating an object (D) on the glass cover (22) with light, and a rod lens array (27) for collecting the light reflected by the object (D) on the glass cover (22) onto the light receiving elements (24). The light emitting elements (25) are mounted on the bottom substrate (23). The contact-type image sensor further comprises a light guide (26) provided in the case (21) for efficiently directing the light from the light emitting elements (25) to a predetermined region (L) of the glass cover (22).

7 Claims, 8 Drawing Sheets

CONTACT-TYPE IMAGE SENSOR

TECHNICAL FIELD

The present invention relates to a contact-type image sensor used in a facsimile machine, image scanner, photocopying machine and so on.

PRIOR ART

Contact-type image sensors are commonly used for reading characters, symbols and other forms of information recorded on a medium such as paper. An image sensor typically comprises an array of light emitting elements as a light source, and an array of light receiving elements. The light emitting element is typically a light emitting diode (LED) whereas the light receiving element is typically a CCD. In operation, light from the light emitting element array is directed to the information medium. The light reflected by the medium is sensed by the light receiving element array so that the image (information) on the object medium can be detected by photoelectric conversion.

Conventionally, a contact-type image sensor of the above type has an arrangement shown in FIG. 9 for example.

Specifically, a contact-type image sensor represented by the numeral code 10 has a substrate 12 provided on a bottom portion of a case 11. The substrate 12 has an array of image sensor tips 12 corresponding to a reading width. The case 11 has an upper surface attached with a transparent cover glass 14. Between the cover glass 14 and the image sensor chip array 13, and aligned with a predetermined reading line L, there is disposed a rod lens array 15 fitted to a support groove 18 formed in the case 11. The rod lens array 15 is known as the selfoc lens array, by which an image on the reading line L is projected as an erected isometric image on the image sensor chip array 13.

The case 11 also includes an inclined substrate 17. The inclined substrate 17 has a plurality of LED chips 16 as a light source from which light is cast to an object D obliquely through the cover glass 14. The object D is moved by a platen P for example while contacted to the cover glass 14.

According to the above contact-type image sensor 10, the LED chips as the light source should be mounted on the inclined substrate 17 instead of the substrate 12 at the bottom so that the object D can be lighted as efficiently as possible. For this reason, the two substrates 12, 17 must be mounted individually, which complicates assembling of the image sensor 10. Using two kinds of substrates 12, 17 increases the number of parts, makes an arrangement more complex, and hence increases cost.

Theoretically, it is possible to eliminate the inclined substrate 17, and mount the LED chips 16 on the bottom substrate 12 together with the image sensor chip array 13. Such an arrangement is not practical, however, because only a very small portion of the light from the LED chips 16 can reach the object D.

Further, with the above arrangement of the image sensor 10, the LED chips 16 are disposed at a higher position than are the image sensor chips 13, being closer to the object D. As a result, the light from each of the LED cannot adequately disperse widthwise (i.e. in the longitudinal directions of the image sensor chip array 13) before reaching the object D. Thus, if a distance between adjacent pair of LED chips 16 is large, quantity of light often becomes uneven widthwise of the object D. This problem may be solved by increasing the number of LED chips 16, disposing the LED chips closer to each other. However, this solution creates a new problem of increased cost due to the increased number of LED chips 16.

DISCLOSURE OF THE INVENTION

It is therefore an object of the present invention to provide a contact-type image sensor having a simple construction for easy assembly.

Another object of the present invention is to provide a contact-type image sensor in which quantity of light does not easily become uneven in the directions of scanning even with a small number of light sources.

According to a first aspect of the present invention, there is provided a contact-type image sensor comprising a common substrate provided with a plurality of light receiving elements and a light source, and a light guide for directing the light from the light source obliquely toward an object.

Advantages of the above arrangement will be discussed later in detail with reference to the accompanying drawings.

According to a preferred embodiment of the present invention, the light guide comprises a prism. The prism includes a first incidence surface facing the light source, a second incidence surface facing the light source while being inclined at a predetermined angle relative to the first incidence surface, at least one total reflection surface, and an outlet surface for casting obliquely toward the object the light reflected by the plane of total reflection surface after incidence via the first and second incidence surfaces.

The first incidence surface of the prism is generally parallel to the substrate whereas the second incidence surface of the prism may be inclined relative to the substrate. Further, both the first and second incidence surfaces of the prism may be inclined relative to the substrate. Still further, the prism may have the first incidence surface inclined relative to the substrate and the second incidence surface generally vertical to the substrate.

For improved lighting efficiency, the light coming from the light source should be prohibited from escaping. For this reason, the prism should be intimately fitted in a holding space of the case. Further, the prism may have ends each provided with a fitting block for intimately fitting in an end portion of the mounting space of the case in order to facilitate ease and reliability in assembly operation. Still further, the prism should preferably have a longitudinally intermediate portion formed with an engaging projection. This projection engages with a recess formed in an inner side wall of the case, prohibiting the prism from spontaneously coming out.

Generally, a plurality of LED chips are used as the light source.

According to a second aspect of the present invention, there is provided a contact-type image sensor comprising a case, a glass cover provided on an upper surface of the case, a bottom substrate mounted in a bottom surface of the case, a plurality of light receiving elements mounted on the bottom substrate, a plurality light emitting elements for irradiating an object on the glass cover with light, and a rod lens array for collecting the light reflected by the object on the glass cover onto the light receiving elements. The light emitting elements are mounted on the bottom substrate. The contact-type image sensor further comprises a light guide provided in the case for efficiently directing the light from the light emitting elements to a predetermined region of the glass cover.

According to a preferred embodiment of the present invention, the case is formed with a holding groove for receiving the rod lens array from above. The light guide has ends each formed with a tab for pressing the rod lens array from above. Further, the holding groove may be formed with a projection for engagement with a longitudinally intermediate portion of the rod lens array from above.

Other objects, features and advantages of the present invention will become clearer from the detailed description of the preferred embodiment to be made with reference to the accompanying drawings.

BEST MODE FOR CARRYING OUT THE INVENTION

Figure 1:
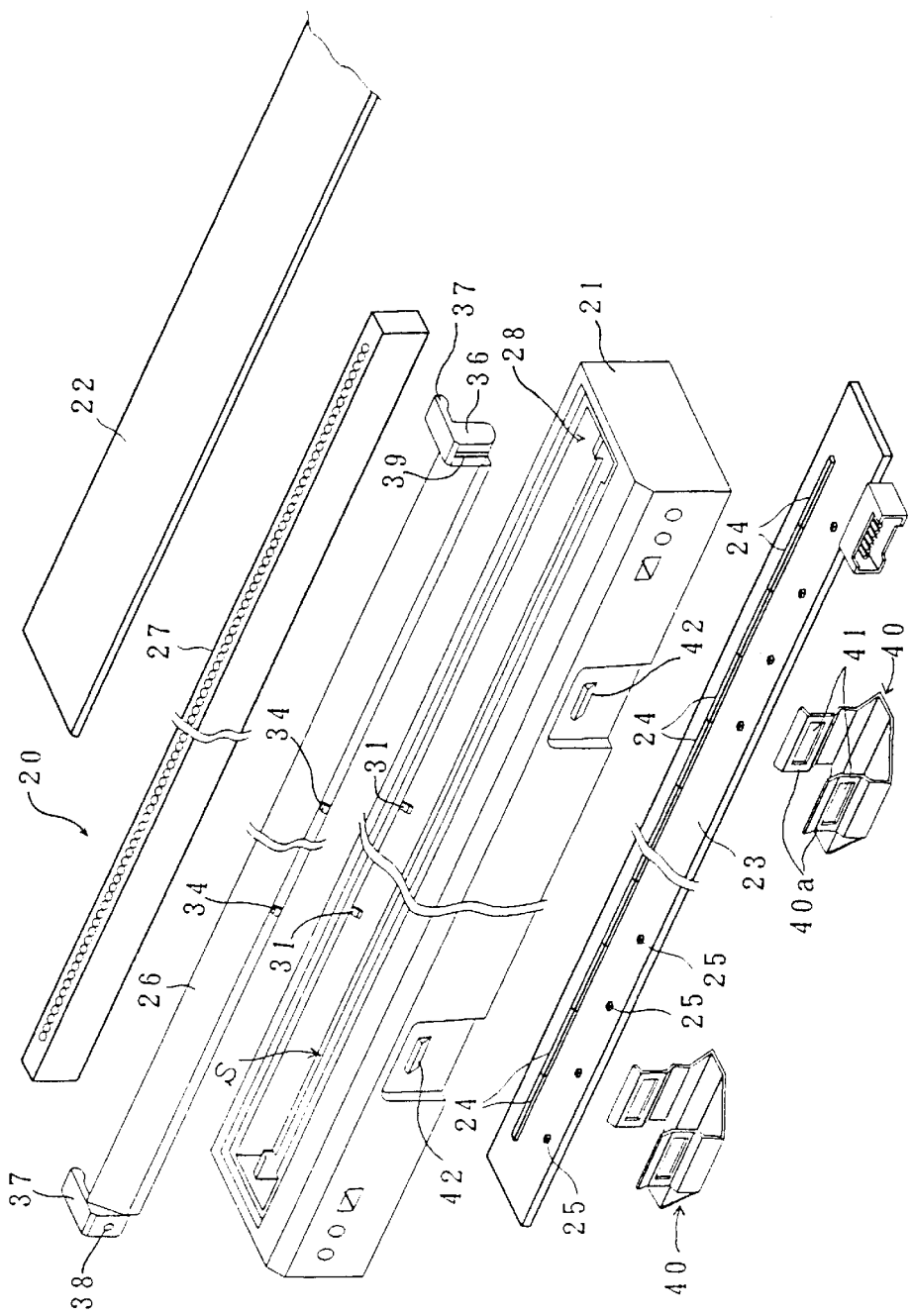
FIG. 1 is an exploded perspective view of a contact-type image sensor according to a first embodiment of the present invention.
Figure 2:
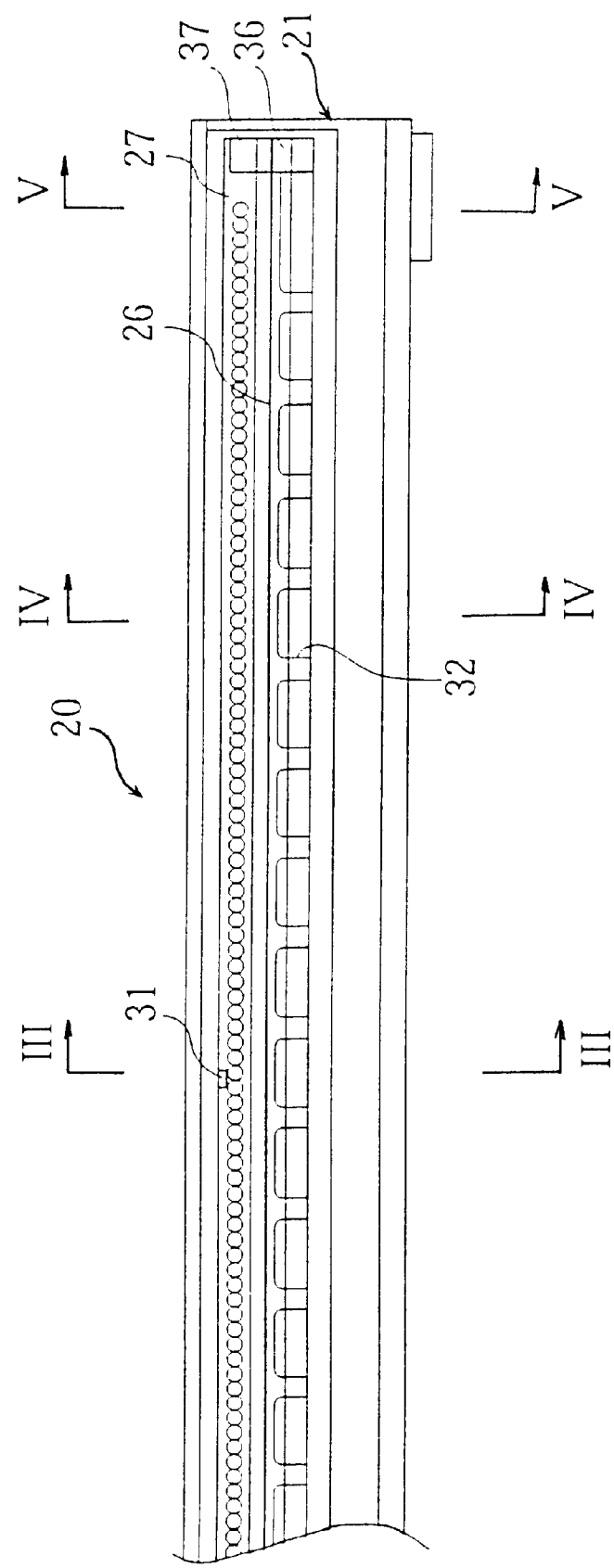
FIG. 2 is a fragmentary plan view of the image sensor.

Preferred embodiments of the present invention will be described in specific detail referring to the accompanying drawings.

FIGS. 1 through 5 show a contact-type image sensor 20 according to the present invention. The image sensor 20 comprises a long case 21 having a predetermined length and a generally rectangular cross section. The case 21 can be molded integrally of resin. As clearly shown in FIG. 3, the case 21 has an inner space S as a perpendicular through hole, with a glass cover 22 sealing an upper opening, and a bottom substrate 23 sealing a bottom opening.

The bottom substrate 23 has an upper surface mounted with an array of image sensor chips 24 along a longitudinal edge of the surface. On the same surface of the bottom substrate 23, and along the other longitudinal edge, a plurality of LED chips 25 are provided in a row at a predetermined interval. According to the present embodiment, each of the LED chips 25 is a bear chip (which is not molded in a package).

Figure 5:
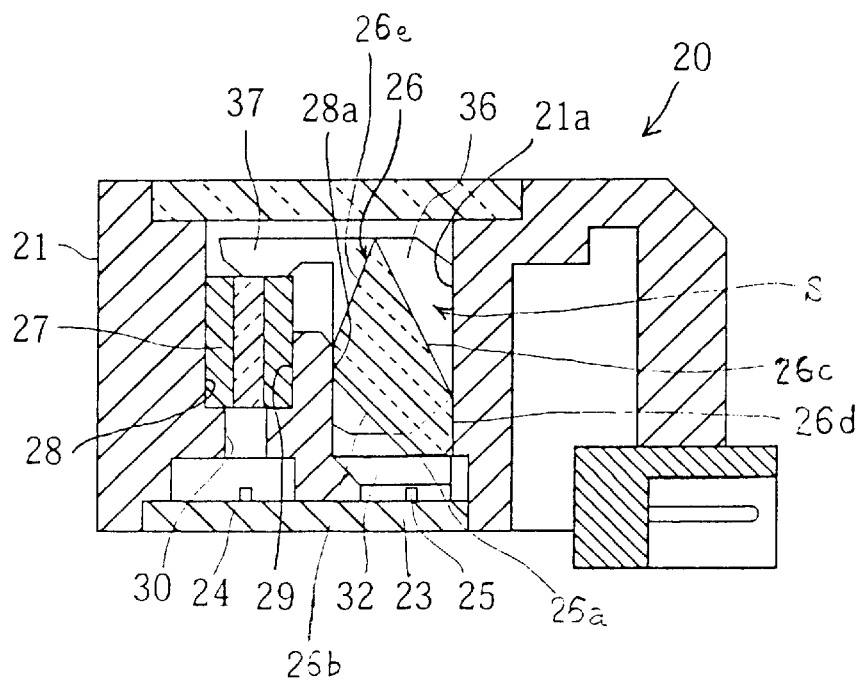
FIG. 5 is an enlarged sectional view taken along lines V—V in FIG. 2.

The inner space S of the case 21 includes a light guide 26 made of a transparent resin for effectively directing the light from the LED chips 25 to an object D on the glass cover 22. According to the present embodiment, as shown in FIG. 5, the light guide 26 is a prism having a predetermined section, including a horizontal first incidence surface 26a, an inclined second incidence surface 26b, an inclined first total reflection surface 26c, a vertical second total reflection surface 26d, and an inclined outlet surface 26e. The prism may be suitably made of a transparent resin material such as polymethyl methacrylate (PMMA), polycarbonate and polystyrene.

The inner space S of the case 21 further includes a rod lens array 27 (selfoc lens array) disposed in parallel to the light guide (prism) 26 for collecting reflected light from the object D into an erected isometric image on the image sensor chip array 24. The rod lens array 27 is held by a holder portion 28 which receives the rod lens array from above. The holder portion 28 has a holding groove 29 corresponding to the plan view shape of the rod lens array 27, and a bottom portion formed with a slit 30 for allowing the light from the rod lens array 27 to pass through to the image sensor chip array 24.

Figure 3:
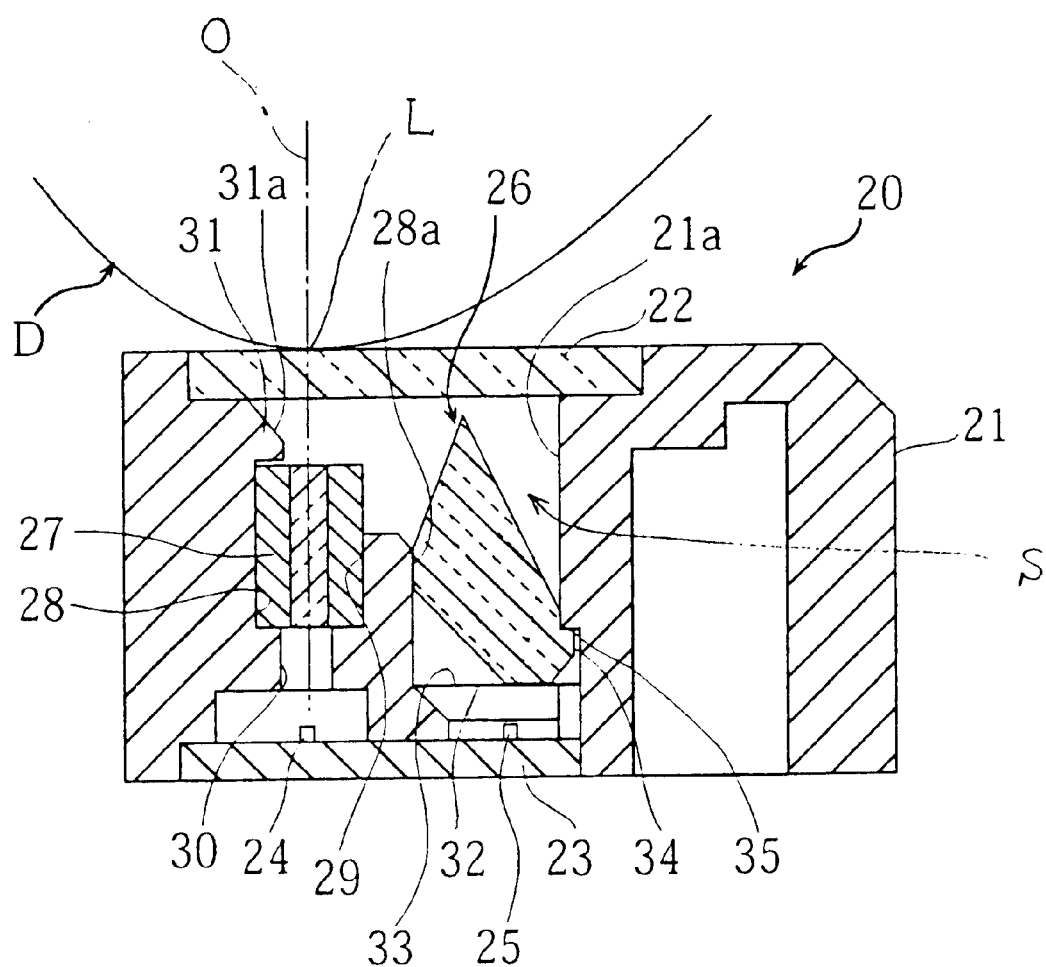
FIG. 3 is an enlarged sectional view taken along lines III—III in FIG. 2.

As clearly seen in FIGS. 1 and 3, the holder portion 28 has a long inner wall. A longitudinally intermediate portion of the inner wall is formed with a pair of projections 31 for engaging with an upper face of the rod lens array 27 so that the rod lens array 27 will not spontaneously come up. As shown in FIG. 3, each of the projections 31 has an appropriate height and is formed with a tapered upper face 31a so as not to interfere with the rod lens array 27 when the rod lens array is inserted into the holder portion 28.

The light guide 26 or the prism introduces the light from the LED chips 25 efficiently to and around a reading line L. The reading line L is disposed on an optical axis O of the rod lens array 27 whereas the LED chips are disposed away from the axis on the bottom substrates 23. The light guide 26 is fitted in a space enclosed by an inner side wall 21a of the case 21, a side wall 28a of the groove holder portion 28, and a bottom wall 33. The bottom wall is formed with a window 32 faced to the LED chips 25.

As shown in FIG. 1, the light guide 26 has a longitudinal side face with an intermediate portion formed with a couple of engaging projections 34. Further, as shown in FIG. 3, the inner side wall 21a of the case 21 is formed with corresponding engaging recesses 25 to engage with the projections 34.

As shown in FIGS. 1 and 5, the light guide 26 has end portions each formed with a fitting block 36 of a predetermined height for fitting between the inner side wall 21a of the case and the side wall 28a of the holder portion 28. Each of the fitting block 36 is formed integrally with an extending tab 37 for pressing a corresponding end portion of the rod lens array 27 from above. One of the fitting blocks 36 has a back face formed with a projection 38 whereas the other fitting block 36 has a back face formed with a rib 39. When each of the fitting blocks 36 is fitted between the inner wall 21a of the case and the side wall 28a, the projection 38 and the rib 39 hold respective fitting blocks 36 firmly by increased friction.

With the above arrangement, the contact-type image sensor 20 of the above arrangement can be assembled in the following steps. Specifically, the rod lens array 27 is inserted from above into the holding groove 29 of the holder portion 28 in the case 21. In this step, each of the engaging projections 31 formed in the inner wall of the holder portion 28 engages with the upper face of the rod lens array 27 so that the rod lens array 27 will not spontaneously come up.

Next, the light guide 26 is fitted from above into the space enclosed by the inner side wall 21a of the case and the side wall 28a of the holder portion 28. In this step, each of the engaging projections 34 formed in the light guide 26 engages with the corresponding recess 35 of the case 21. Further, the fitting blocks 36 are held in the space firmly by friction, so the light guide 26 are held accurately at a predetermined position, being prohibited from spontaneous upward rise. The pressing tab 37 extending from each of the fitting block 36 of the light guide 26 presses from above the corresponding end portion of the upper face of the rod lens array 27. Thus, the rod lens array 27 is pressed at its longitudinally intermediate portions by the engaging projections 31 and at its longitudinally end portions by the pressing tabs 37, thus being held stably and firmly at the predetermined position.

Figure 4:
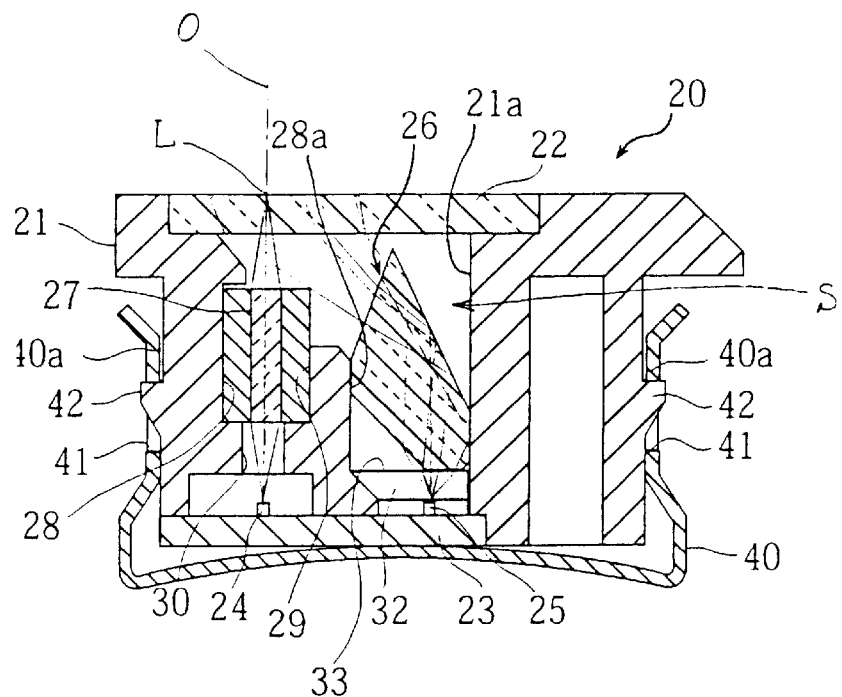
FIG. 4 is an enlarged sectional view taken along lines IV—IV in FIG. 2.

The glass cover 22 is fitted by bonding for example, into the upper opening of the case 21. The bottom substrate 23 is fitted into the bottom opening of the case 21 and is fixed by metal clamps 40. As shown in FIGS. 1 and 4, each of the clamps 40 is a generally U-shaped piece of spring steel with each of its leg portions 40a formed with an engaging hole 41 to engage with a corresponding engaging projection 42 formed on corresponding outer side faces of the case 21.

As described above, in the contact-type image sensor 20 according to the present embodiment, the rod lens array 27 and the light guide 16 can be assembled by simple fitting operations using no adhesive, separate fasteners or tools. Further, one bottom substrate 23 includes not only the image sensor chip array 24 but also the plurality of LED chips as light source. This eliminates a need for a separate substrates for the LED chips 25, reducing the number of necessary parts as a whole, simplifying the assembly operation, and reducing the cost of the contact-type image sensor.

Further, according to the above embodiment, the bottom substrate 23 placed to the bottom opening of the case 21 is held to the case by the metal clamps 40. Thus, the bottom substrate 23 can also be fixed to the bottom face of the case 21 by a simple operation without relying upon such complicated fixing means as bonding or screwing.

Now, the contact-type image sensor 20 with the above arrangement operates as follows. Specifically, as shown in FIG. 4, when each of the LED chips 25 illuminates, the light from the chips enters the light guide 26 after refracting on the horizontal first incidence surface 26a or the inclined second incidence surface 26b of the light guide 26. The light coming into the light guide 26 is totally reflected by the inclined first total reflection surface 26c or the vertical second total reflection surface 26d. The light is refracted again on the outlet surface 26, and then goes out of the light guide 26 obliquely. After getting out of the light guide 26, the light is further refracted by the cover glass (having a refractive index of 1.52 for example), and then thrown to the object D (FIG. 3). The light reflected by the object D on the reading line L goes through the rod lens array 27, and then focuses on the image sensor chip array 27, where information on the object D is optically picked. It should be noted here that the object D is transported by a platen for example while being contacted to the glass cover 22 so that all of the information on the object D is continuously read.

Figure 9:
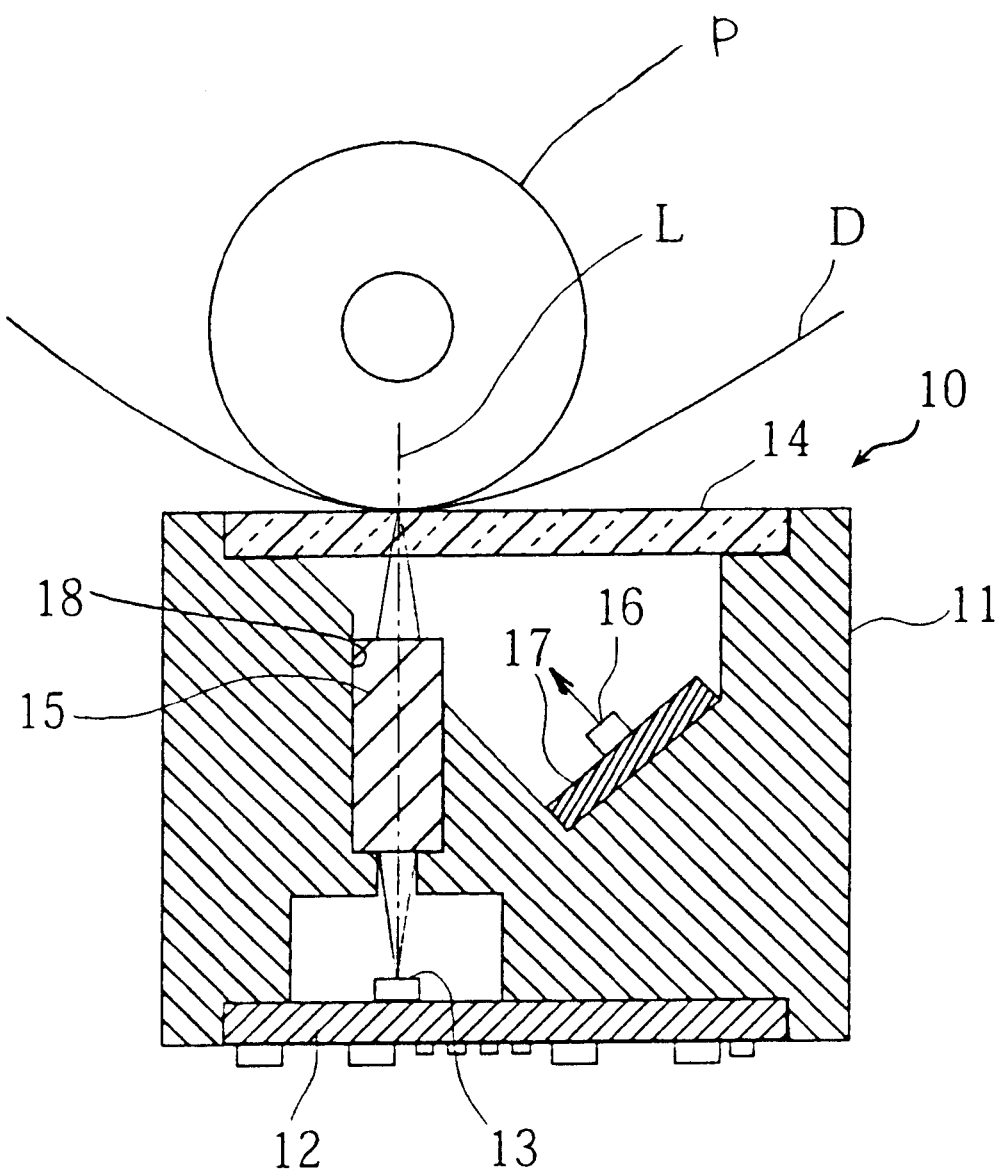
FIG. 9 is a cross-sectional view showing a prior art contact-type image sensor.

As described above, even though the LED chips 25 is mounted on the bottom substrate 23 together with the image sensor chip array 24, the light can be thrown as efficiently as in the case where the light source is mounted obliquely (see prior art in FIG. 9), because the prism as the light guide 26 throws the light obliquely from its outlet surface 26e to the object D. In addition, the prism 26 converges the light from the LED chips 25 crosswise of the reading line L, further increasing the lighting efficiency. In order to maximize the lighting efficiency by taking all the light from the LED chips 25 into the prism 26, the two side walls 21a and 28a which provide the holding space for the prism 26 should be made to intimately fit to the prism 26 so that no light can escape.

Further, an optical distance from each of the LED chips 25 through the prism 26 to the reading line L can be made longer than a straight distance from the LED chips 25 to the outer surface of the glass cover 22. Thus, the light after getting out of the LED chips 25 can adequately disperse axially of the reading line L, making possible to reduce the number of LED chips 25 (i.e. to increase the distance between adjacent LED chips 25) while maintaining generally even lighting along the reading line L. Preferably, the prism 26 should collect light crosswise of the reading line L for increased intensity of light on the reading line L, while dispersing the light longitudinally of the reading line L for even lighting with a small number of LED chips.

Preferably, the optical distance from each of the LED chips 25 through the prism 26 to the reading line L should be made generally equal to the pitch between a pair of adjacent LED chips 25. For example, if the pitch between a pair of adjacent LED chips 25 is 12 mm, the distance from each of the LED chips to the outer surface of the glass cover 22 should be about 9 to 10 mm to make the optical distance generally equal to the pitch between the LED chips 25.

According to the above first embodiment, the first total reflection surface 26c and the second total reflection surface 26d may be vaporized with metal such as aluminum so that the reflection surfaces 26c, 26d have mirror surfaces for perfect reflection. Further, a bar-shaped convex lens may be placed between the outlet surface 26e of the prism 26 and the reading line L so that the light coming out of the outlet surface 26e will converge more on and around the reading line L.

Figure 6:
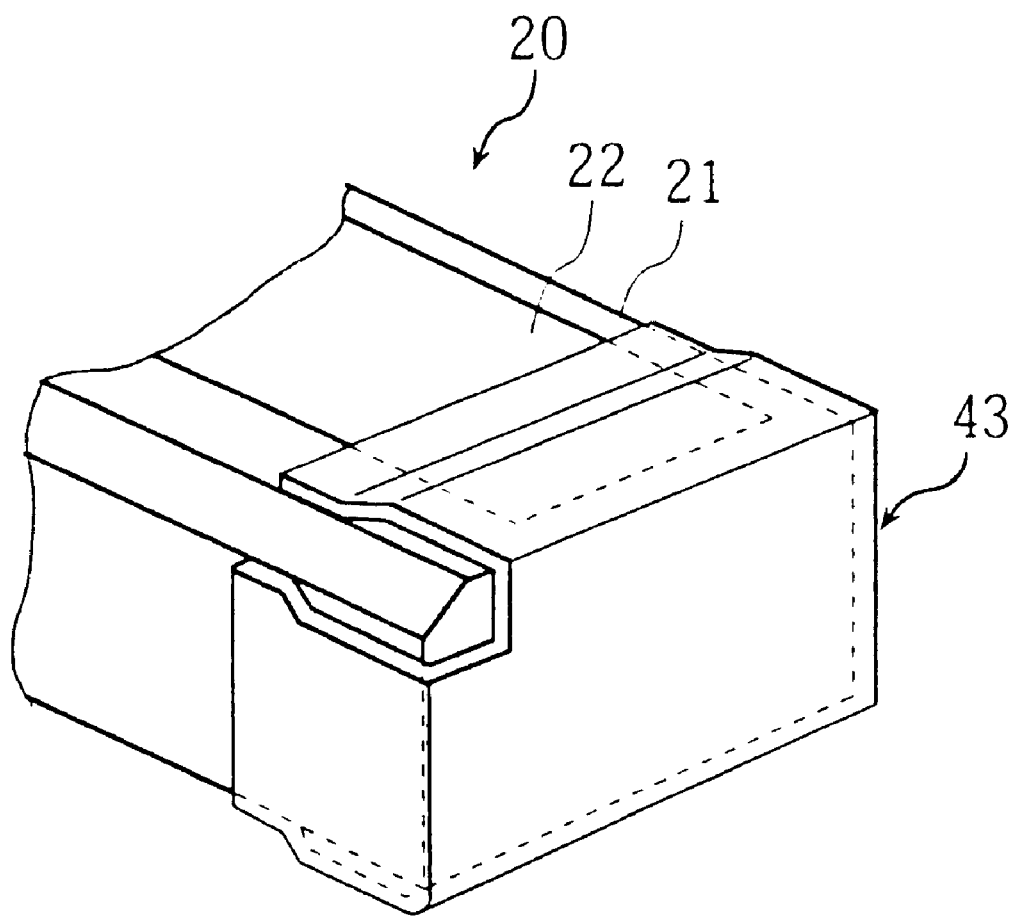
FIG. 6 is a fragmentary perspective view showing a variation to the first embodiment, differing only in means for fixing a cover glass to a case.

FIG. 6 shows a variation to the first embodiment. According to the variation, the glass cover 22 is fixed by metal caps 43 fitted around respective ends of the case 21 instead of bonding to the upper opening of the case 21.

Figure 7:
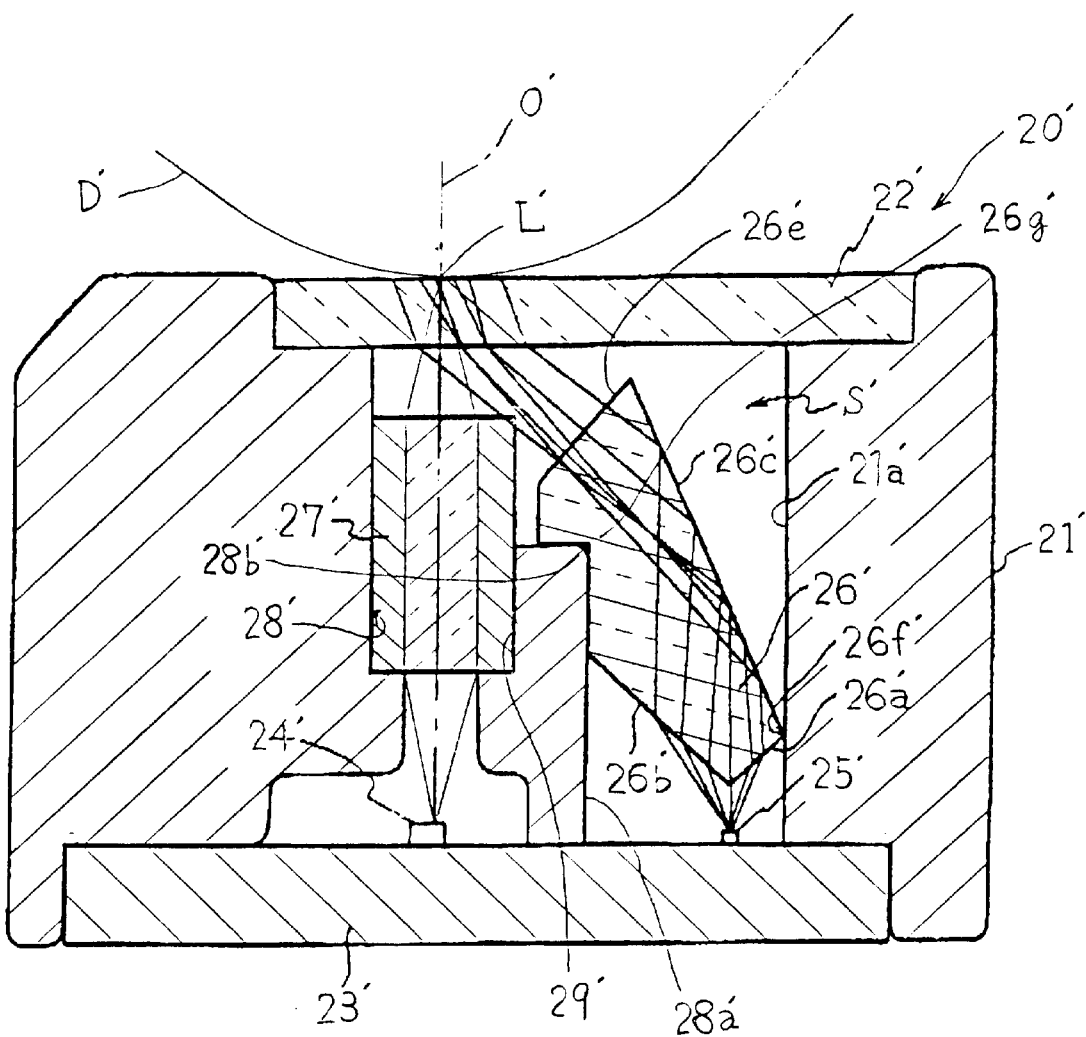
FIG. 7 is a cross-sectional view showing a contact-type image sensor according to a second embodiment of the present invention.
Figure 8:
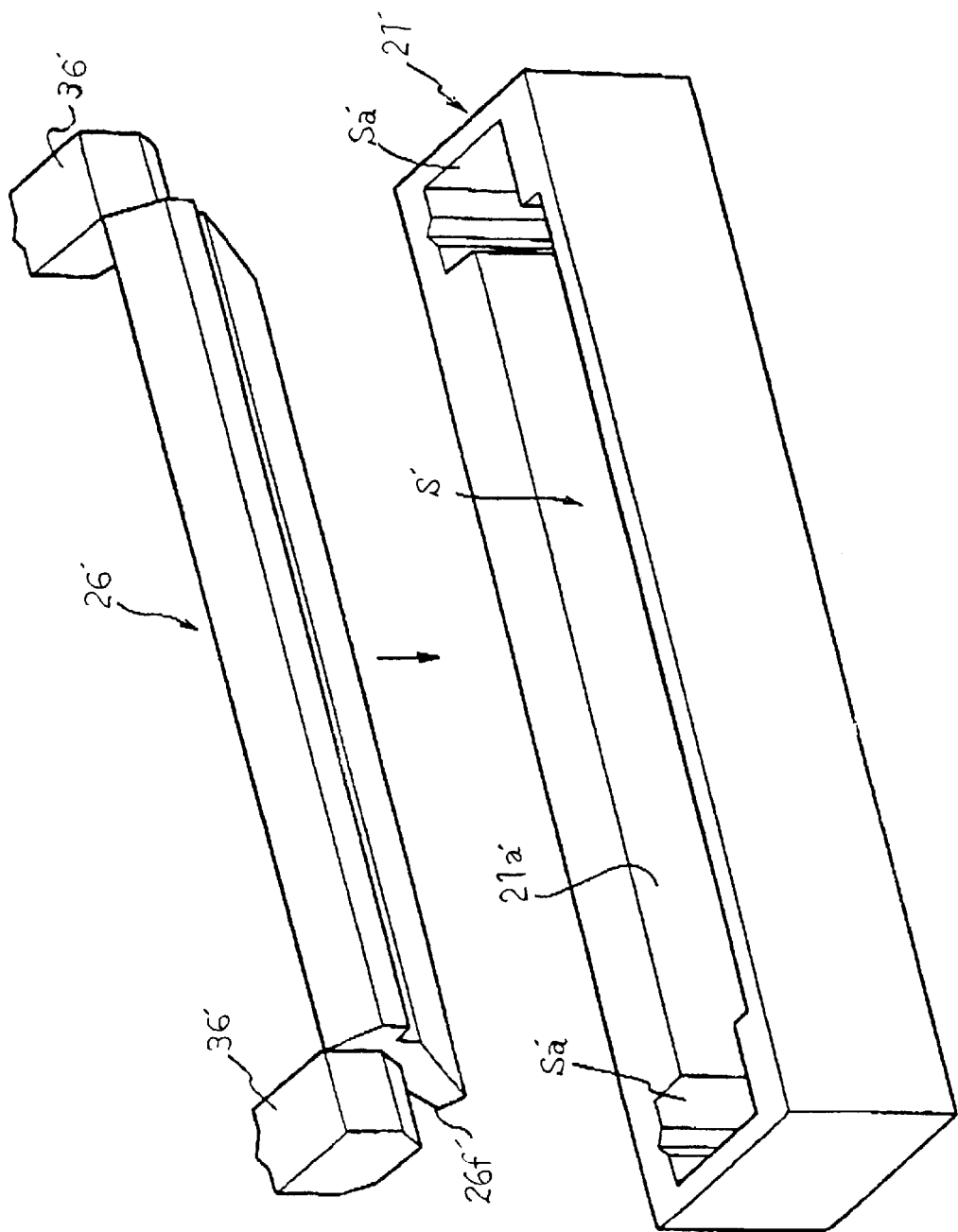
FIG. 8 is an exploded perspective view showing the image sensor according to the second embodiment.

FIGS. 7 and 8 show a contact-type image sensor 20' according to a second embodiment of the present invention. The image sensor according to the second embodiment is generally the same as the first embodiment. Similar members are given the same alphanumeric codes with a prime (') symbol, and will not be described further. The second embodiment chiefly differs from the first embodiment in the form of the prism as the light guide 26'.

Specifically, the prism 26' according to the second embodiment has a first incidence surface 26a' inclined obliquely upward in one direction, a second incidence surface 26b' inclined obliquely upward in the opposite direction from the first incidence surface 26a', an inclined total reflection surface 26c', an inclined outlet surface 26e', and an engaging notch 26g' formed below the outlet surface 26e'. When the prism 26' is inserted into the mounting space enclosed by the inner wall 21a' of the case 21' and the side wall 28a' of the holder portion 28', the engaging notch 26g' engages with a corresponding corner 28b' of the holder portion 28'. Further, a corner 26f made by the first incidence surface 26a' and the total reflection surface 26c' of the prism 26' fits intimately to the inner side wall 21a' of the case 21'.

According to the image sensor 20' as the second embodiment, all of the light from each of the LED chips 25' enters the prism 26' after refracting on the first incidence surface 26a' or the second entrance face 26b'. The light is then totally reflected by the total reflection surface 26c' before getting out of the outlet surface 26e' obliquely toward the reading line L'. The prism 26' converges the incident light crosswise of the reading line L' while dispersing it axially of the reading line L'. Thus, the second embodiment has the same effect as in the first embodiment.

On the other hand, as shown in FIG. 8, the prism 26' has end portions each formed with an enlarged fitting block 36'. The case 21' has end portions each formed with an enlarged holding space Sa' corresponding to the enlarged fitting block 36'. When the prism 26' is inserted from above into the holding space S' of the case 21', each of the enlarged fitting blocks 36' fits into corresponding enlarged holding space Sa'. Thus, the prism 26 can be mounted easily without using an adhesive, for example. It should be noted that FIG. 8 shows only the case 21' and prism 26' for descriptive conveniences.

The preferred embodiments of the present invention being thus described, it is obvious that the present invention should not be limited to these embodiments. For example, the form of the prism as the light guide can be varied in any ways as far as it reflects and converges light from the LED chips for directing obliquely toward the object. Further, the light guide may not necessarily be a prism but, for example, may be a bundle of optical fibers instead.

What is claimed is:

1. A contact-type image sensor comprising: a common substrate provided with a plurality of light receiving elements and a light source; and a light guide for directing the light from the light source obliquely toward an object, wherein the light guide comprises a prism which is intimately fitted in a mounting space of a case; and wherein the prism includes a first incidence surface facing the light source, a second incidence surface inclined at a predetermined angle relative to the first incidence surface, at least one total reflection surface, and an outlet surface for casting obliquely toward the object the light reflected by the total reflection surface after incidence via the first and second incidence surfaces.

2. The contact-type image sensor according to claim 1, wherein the first incidence surface of the prism is generally parallel to the substrate whereas the second incidence surface of the prism being inclined relative to the substrate.

3. The contact-type image sensor according to claim 1, wherein both the first and the second incidence surfaces of the prism are inclined relative to the substrate.

4. The contact-type image sensor according to claim 1, wherein the prism includes a total reflection surface inclined relative to the substrate, and second total reflection surface generally vertical to the substrate.

5. The contact-type image sensor according to claim 1, wherein the prism has two ends each provided with a fitting block for intimately fitting in an end portion of the mounting space of the case.

6. The contact-type image sensor according to claim 1, wherein the prism has a longitudinally intermediate portion formed with an engaging projection, the case having an inner side wall provided with a recess for engagement with the engaging projection of the prism.

7. The contact-type image sensor according to claim 1, wherein the light source comprises a plurality of LED chips.

* * * * *